United States Patent
Huang

(10) Patent No.: US 8,942,515 B1
(45) Date of Patent: Jan. 27, 2015

(54) METHOD AND APPARATUS FOR IMAGE RETRIEVAL

(71) Applicant: Lida Huang, Austin, TX (US)

(72) Inventor: Lida Huang, Austin, TX (US)

( * ) Notice: Subject to any disclaimer, the term of this patent is extended or adjusted under 35 U.S.C. 154(b) by 165 days.

(21) Appl. No.: 13/662,389

(22) Filed: Oct. 26, 2012

(51) Int. Cl.
G06K 9/54 (2006.01)
G06K 9/60 (2006.01)
G06K 9/46 (2006.01)
G06K 9/66 (2006.01)

(52) U.S. Cl.
USPC ............ 382/305; 382/190; 382/195; 382/201

(58) Field of Classification Search
USPC .................................. 382/190, 195, 201, 305
See application file for complete search history.

(56) References Cited

U.S. PATENT DOCUMENTS

| | | | | |
|---|---|---|---|---|
| 4,817,183 | A * | 3/1989 | Sparrow | 382/125 |
| 5,450,504 | A * | 9/1995 | Calia | 382/118 |
| 5,644,765 | A * | 7/1997 | Shimura et al. | 1/1 |
| 6,463,432 | B1 * | 10/2002 | Murakawa | 1/1 |
| 8,199,980 | B2 * | 6/2012 | Shah et al. | 382/118 |
| 8,611,695 | B1 * | 12/2013 | Han et al. | 382/284 |
| 8,732,172 | B2 * | 5/2014 | Tan et al. | 707/737 |
| 8,744,196 | B2 * | 6/2014 | Sharma et al. | 382/224 |
| 2002/0164075 | A1 * | 11/2002 | Acharya et al. | 382/190 |
| 2005/0165747 | A1 * | 7/2005 | Bargeron et al. | 707/3 |
| 2006/0147094 | A1 * | 7/2006 | Yoo | 382/117 |
| 2010/0080469 | A1 * | 4/2010 | Liu et al. | 382/201 |
| 2011/0123120 | A1 * | 5/2011 | Quack | 382/197 |
| 2013/0016912 | A1 * | 1/2013 | Li et al. | 382/197 |
| 2013/0142439 | A1 * | 6/2013 | Xin et al. | 382/201 |
| 2013/0163875 | A2 * | 6/2013 | Lai et al. | 382/190 |
| 2013/0223737 | A1 * | 8/2013 | Anbai et al. | 382/170 |
| 2013/0236067 | A1 * | 9/2013 | Savvides et al. | 382/117 |

OTHER PUBLICATIONS

Cho et al., Image retrieval using topological structure of user sketch, 1998, IEEE SMC98.*

* cited by examiner

Primary Examiner — John Strege
(74) Attorney, Agent, or Firm — Che-Yang Chen; Law Office of Michael Chen

(57) ABSTRACT

An efficient image retrieval method utilizing topological order distance (TOD) algorithm is disclosed. In one aspect, an image recognition method may include steps of receiving one or more input images; extracting one or more key features on the input images; determining an origin and one or more feature points on the key features on the input images; establishing a topological relationship in each dimension between the feature points on the key features; and utilizing the topological relationship in each dimension between the feature points to identify the input images in an image database. Comparing with the conventional image retrieval techniques, the TOD algorithm is advantageous because it is more efficient, scale and rotation invariant, and tolerant to affine and perspective transformation.

18 Claims, 18 Drawing Sheets

FIG. 1 (Prior Art)

EXPERIMENT 4

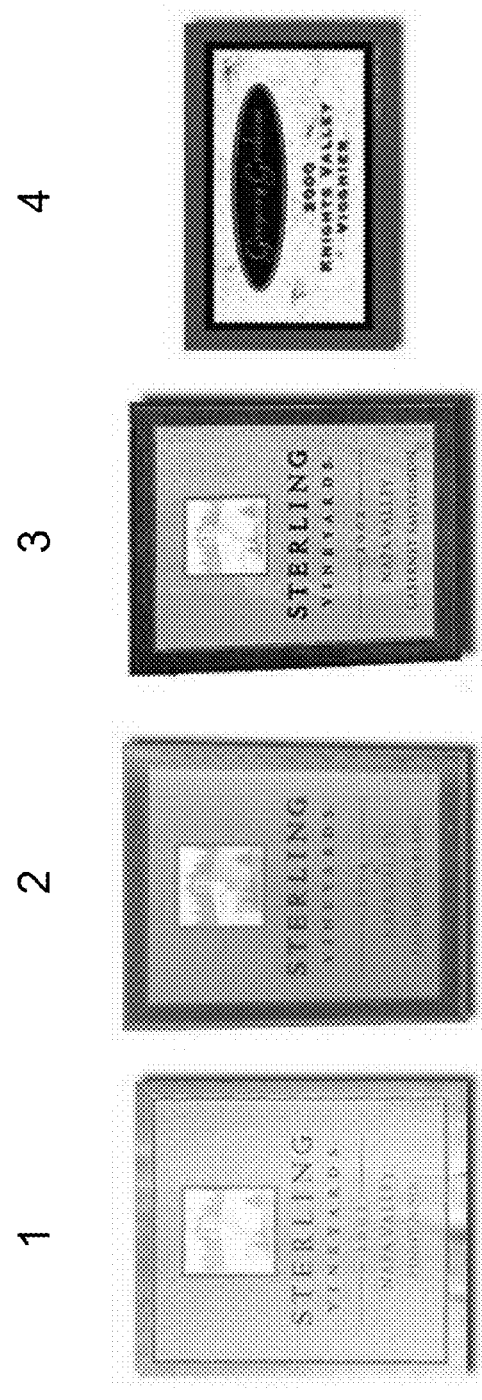

METHOD AND APPARATUS FOR IMAGE RETRIEVAL

FIELD OF THE INVENTION

The present invention relates to a method and apparatus for image retrieval, and more particularly to an efficient method and apparatus to retrieve images from an image database to match an input image, regardless of the conditions of the input image.

BACKGROUND OF THE INVENTION

With remarkable advances of computer technologies and the increasing popularity of digital cameras and digital video cameras, it is common for an individual to possess a large database of digital images, and how to efficiently retrieve desired images from the image database becomes an increasingly important topic in computer vision.

Content-Based Image Retrieval (CBIR) addresses the matching and retrieval of images that share similar visual contents with a given image. The most common CBIR method for comparing two images in content-based image retrieval (typically an example image and an image from the database) is using an image distance measure. An image distance measure compares the similarity of two images in various dimensions such as color, texture, shape, and others. More advanced CBIR systems retrieve images by statistically attaching linguistic indexes and retrieving by index association or using learned mappings in feature space to group similar images. However, the CBIR system may have limitation when handling images with scale or rotation variations.

For any object in an image, interesting points on the object can be extracted to provide a "feature description" of the object, which can then be used to identify the object when attempting to locate the object in another image including many other objects. To perform reliable recognition, it is important that the extracted features are detectable even under changes in image scale, noise and illumination. Scale Invariant Feature Transforms (SIFT), developed by David Lowe in 1999, is an algorithm that is invariant to rotation, translation and scale variation between images. In other words, the key points extracted and described by SIFT were robustly invariant to common image transforms. However, there may be a significant amount of data generated by using the SIFT method and high computational cost to process these data may be involved.

SURF (Speeded Up Robust Feature), another algorithm similar to SIFT, was proposed by Herbert Bay et al. in 2006 to ensure high speed in three of the feature steps: detection, description and matching. Utilizing the Hessian matrix, SURF significantly increases the processing speed without sacrificing the quality of detection points. As shown in FIG. 1, SURF can complete the detection process of the wine tag in 78.2 ms, while SIFT is taking a longer time of 855.09 ms. More specifically, SURF algorithm may include a feature extraction process, and a so called "blob detection" technique is often used to extract key features. Blob detection refers to a feature finding method that detects points and/or regions in an image having different properties such as brightness, color, etc. compared with the environment, and the Hessian matrix is used to generate the blobs to locate key features. As can be seen in FIG. 2, a plurality of blobs are generated utilizing the Hessian matrix to identify key features in a sunflower field image (Herbert Bay, Andreas Ess, Tinne Tuytelaars, Luc Van Gool "SURF: Speeded Up Robust Features", Computer Vision and Image Understanding (CVIU), Vol. 110, No. 3, pp. 346-359, 2008, which is incorporated herein by reference). However, SURF still has its limitations especially when the resolution of the image is low.

In addition to SIFT and SURF that are commonly used in the computer vision community, a recognition scheme called "Scalable Recognition with a Vocabulary Tree" has been proposed recently. FIG. 3 illustrates an example for the vocabulary tree scheme, where a large number of elliptical regions 301 are extracted from the image and a descriptor vector is computed for each region (www.es.ualberta.ca/~vis/vision06/slides/birs2006-nister-index.pdf, which is incorporated herein by reference). The vocabulary tree is then used to hierarchically quantize the descriptor vector into several quantization layers. For example, in the first quantization layer, the descriptor is assigned to the closest three closest green centers 302 to 304, and in the second quantization layer, it is assigned to the closest three blue descendants to the green centers 302 to 304. In the vocabulary tree, each node is associated with an inverted file with references to the images containing an instance of the node, and the images in the database are hierarchically scored using the inverted files at multiple levels of the vocabulary tree. However, the noise level is usually high in the vocabulary tree scheme and some quantization errors are embedded. Furthermore, the vocabulary tree scheme cannot efficiently capture local features of the image.

Therefore, there remains a need for a new and improved method and apparatus to efficiently retrieve images, especially when the quality of the image may be affected by scale, orientation, background clutter, lighting conditions, shape of the image, etc.

SUMMARY OF THE INVENTION

It is an object of the present invention to provide a method and apparatus to efficiently retrieve images, especially when the resolution of the image is low, the size of the image is tiny, or the shape of the image is irregular.

It is another object of the present invention to provide an efficient image retrieval method and apparatus that is rotation invariant, scale invariant, and tolerant to affine and perspective transformation.

It is a further object of the present invention to provide an efficient image retrieval method and apparatus that not only compares features between images, but also focuses on a topological relationship in each dimension between the features.

It is still a further object of the present invention to use the topological relationship between the key features to generate a topological order distance (TOD) to further identify and recognize input images in an image database.

According to one aspect of the present invention, an image recognition method may include steps of receiving one or more input images; extracting one or more key features on the input images; determining an origin and one or more feature points on the key features on the input images; establishing a topological relationship in each dimension between the feature points on the key features; and utilizing the topological relationship in each dimension between the feature points to identify the input images in an image database.

In one embodiment, the step of extracting one or more key features on the input images may include a step of generating a plurality of blobs to identify key features on the input images. In another embodiment, the step of extracting one or more key features on the input images may include the edge detection technique, especially when the key features of the image have discontinuities in depth and orientation, or the brightness of key features changes sharply. In a further embodiment, the step may include the feature extraction technique of corner detection. In still a further embodiment, the step may include the technique of descriptor-detector local feature extractions.

In still a further embodiment, the step of determining an origin and one or more feature points on the key features on the input images may include steps of selecting an origin on the input images; converting an initial coordinate system into a predetermined coordinate system; and selecting one or more feature points representing some key features near the origin. In a further embodiment, the predetermined coordinate system is a polar coordinate system.

In an exemplary embodiment, the step of establishing a topological relationship in each dimension between the feature points on the key features may include steps of calculating and sorting the distances between each feature points and the origin to produce one or more sequences according to the dimension of the image. In a two-dimensional image, the step of establishing a topological relationship in each dimension between the feature points on the key features may include steps of calculating and sorting the distances between each feature points and the origin to produce a magnitude sequence; and calculating and sorting the angles between each feature points and the origin to produce a radius sequence.

In still an exemplary embodiment, the step of utilizing the topological relationship in each dimension between the feature points to identify the input image in an image database may include steps of building a predetermined data structure in the image database; providing the key features from the input image; retrieving the key features (from the input image) in the predetermined data structure within a given range; comparing the sequence(s) between the input images and possible matching images in the image database to generate one or more TOD scores; and calculating and sorting the TOD scores to retrieve matching images in the image database. In a two-dimensional image, the step of utilizing the topological relationship between the feature points to identify the input image in an image database includes steps of building a predetermined data structure in the image database; providing the key features from the input image; retrieving the key features (from the input image) in the predetermined data structure within a given range; comparing the magnitude sequences and radius sequences between the input images and possible matching images in the image database to generate an M-TOD score and an R-TOD score; and calculating and sorting the M-TOD and R-TOD scores to retrieve matching images in the image database.

In another aspect of the present invention, a system for image retrieval may include an initial image receiver; a key feature extracting unit including a feature point generator; an image database and an image processor executing instructions to perform the steps of establishing a topological relationship in each dimension between the feature points on the key features and utilizing the topological relationship in each dimension between the feature points to identify the input image in the image database. The image retrieval system may also include a memory device and a user interface, which may be operatively communicated with the image processor to perform image recognition and retrieval.

In one embodiment, the feature point generator is configured to select an origin among the key features, and the origin is better surrounded by the key features that would better represent the given image. Also, the feature generator is configured to convert an initial coordinate system into a predetermined coordinate system and select one or more feature points representing the key features near the origin. In an alternative embodiment, the predetermined coordinate system is a polar coordinate system.

In an exemplary embodiment for a two-dimensional image, the image processor may include a magnitude sequence generator and a radius sequence generator. The magnitude sequence generator is configured to measure the distances between each feature points and the origin; compare such information; and produce a magnitude sequence, while the radius sequence generator is configured to measure the angles between each feature points and the origin; compare such information; and produce a radius sequence.

In still an exemplary embodiment for a two-dimensional image, the image processor also includes an image retrieving unit and an M-TOD/R-TOD processor. The image retrieving unit is configured to efficiently retrieve images that may match the input image from the image database, wherein the image retrieving unit may build a predetermined data structure (e.g. k-d tree) to divide the images in the image database into a plurality of sub-groups. Provided with the information of key features of the input image, the image retrieving unit is configured to retrieve possible matching images from the image database according to the k-d tree structure, and the magnitude sequence generator and radius sequence generator would perform identical magnitude/radius sequence generating process to the possible matching images extracted from the image database. The M-TOD/R-TOD processor is adapted to compare the magnitude/radius sequence between the input image and the possible matching images, calculate scores based on the comparison of the magnitude/radius sequence therebewteen, and determine the matching images in the image database. The matching images can be outputted through the user interface.

Comparing with the conventional image retrieval techniques such as SIFT, SURF, vocabulary tree, etc., the TOD algorithm is advantageous because it is more efficient, scale and rotation invariant, and tolerant to affine and perspective transformation.

BRIEF DESCRIPTION OF THE DRAWINGS

FIG. 1 illustrates a comparison between two conventional image retrieval techniques.

FIG. 6b shows the possible matching images extracted from the image database.

FIG. 7b shows the possible matching images extracted from the image database.

FIG. 8b shows the possible matching images extracted from the image database.

FIG. 9b shows the possible matching images extracted from the image database.

FIGS. 10a and 10b illustrate an experiment testing the TOD algorithm in the present invention, wherein FIG. 10a an input image, and FIG. 10b shows the possible matching images extracted from the image database.

FIG. 11b shows the possible matching images extracted from the image database.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

As previously discussed, feature detection and image matching become an increasingly important topic in the area of computer vision. However, due to appearance variabilities caused by non-rigidity, background clutter, differences in viewpoint, orientation, scale or lighting conditions, it is difficult and challenging to efficiently retrieve images from an image database. Current image retrieving/matching algorithms (such as CBIR, SIFT, SURF, vocabulary tree, etc.) may perform acceptably well in presence of some of the image conditions stated above, but in general, none of the algorithms have truly accomplished total invariance to those conditions. Therefore, there remains a need for a new and improved method and apparatus to overcome the image conditions described above and efficiently retrieve desired image (s).

Figure 4:
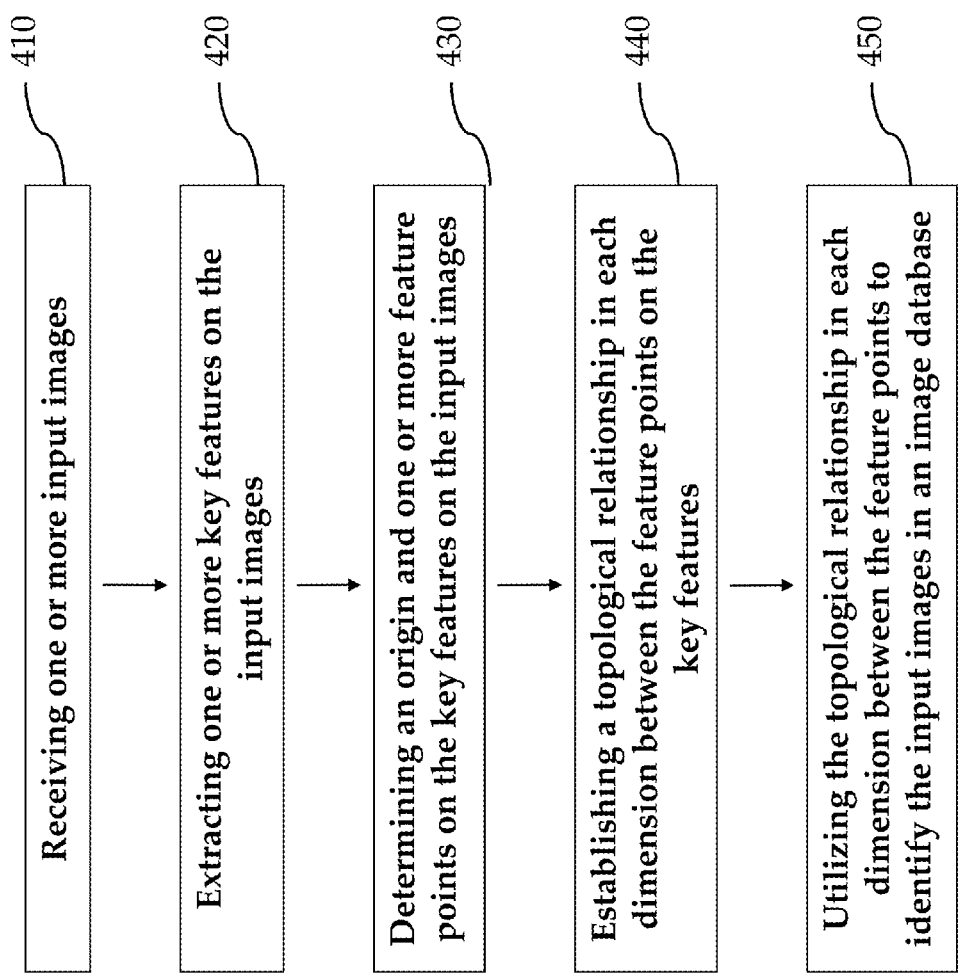
FIG. 4 illustrates a method for efficient image retrieval in the present invention.

In one aspect shown in FIG. 4, an image recognition method may include steps of receiving one or more input images 410; extracting one or more key features on the input images 420; determining an origin and one or more feature points on the key features on the input images 430; establishing a topological relationship in each dimension between the feature points on the key features 440; and utilizing the topological relationship in each dimension between the feature points to identify the input images in an image database 450.

Figure 2:
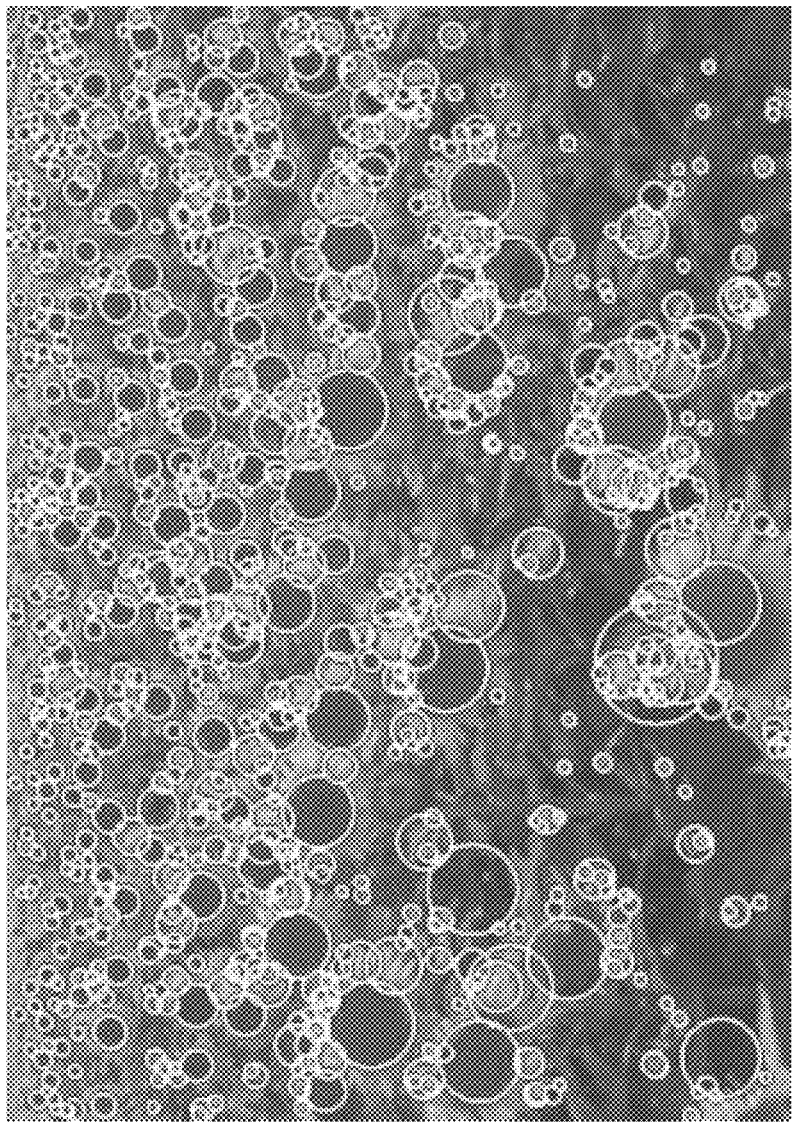
FIG. 2 illustrates a plurality of blob detectors generated by the Hessian matrix to identify key features in a sunflower field image.
Figure 3:
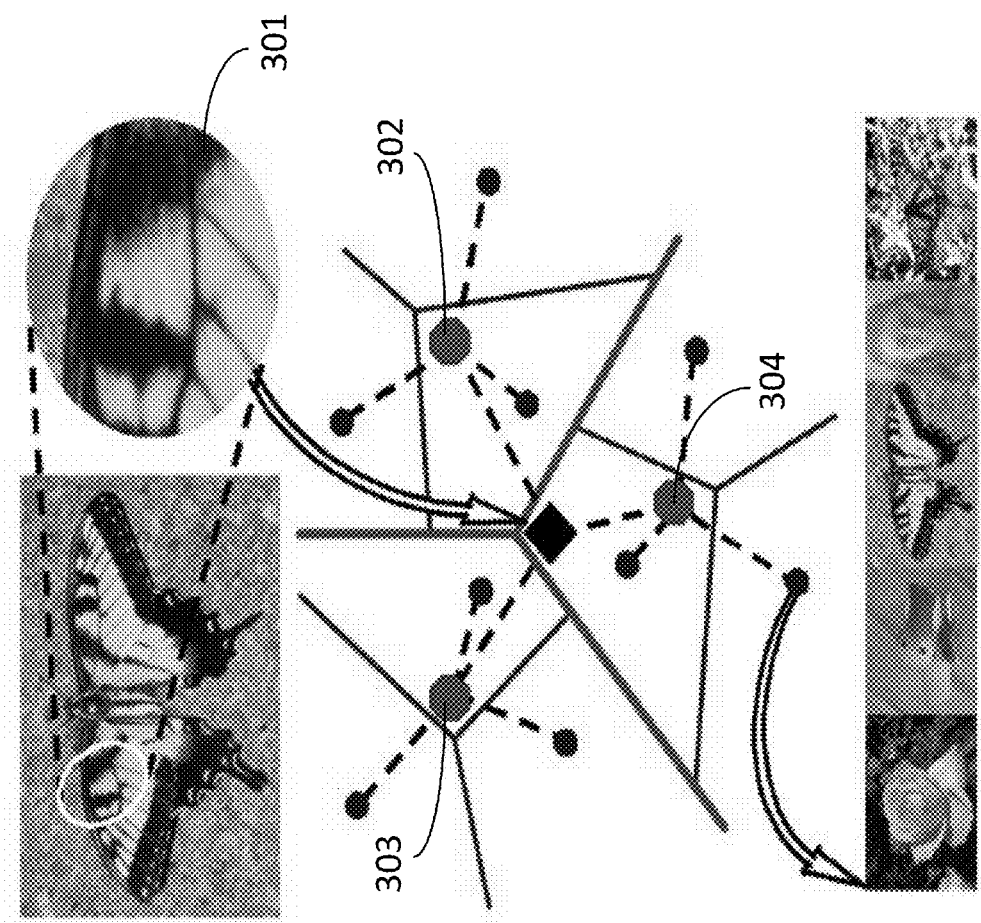
FIG. 3 illustrates an example for the vocabulary tree scheme, where a large number of elliptical regions are extracted from the image and a descriptor vector is computed for each region.

As described above, key feature extraction techniques are often employed in the area of image processing and several algorithms to extract key features have been developed according to the characteristics of the image. In one embodiment, the step of extracting one or more key features on the input images 420 may include a steps of generating a plurality of blobs to identify key features, wherein blob detection refers to the detection of points and/or regions in an image having different properties such as brightness, color, etc. compared with the environment, as shown in FIG. 2. In another embodiment, the step of extracting one or more key features on the input images 420 may include the edge detection technique, especially when the key features of the image have discontinuities in depth and orientation, or the brightness of key features changes sharply. In a further embodiment, the step 420 may include the feature extraction technique of corner detection. In still a further embodiment, the step 420 may include the feature extraction technique of descriptor-detector local feature extractions.

Figure 4A:
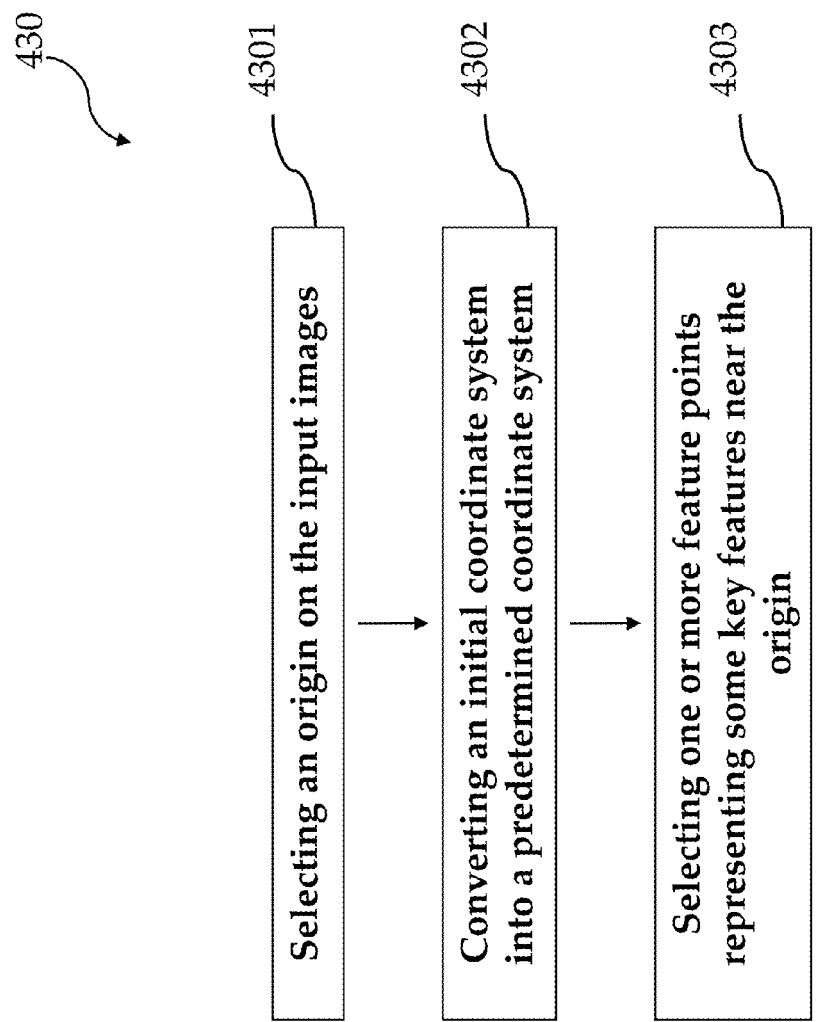
FIG. 4a depicts further steps to determine an origin and one or more feature points on the key features on the input image.
Figure 4B:
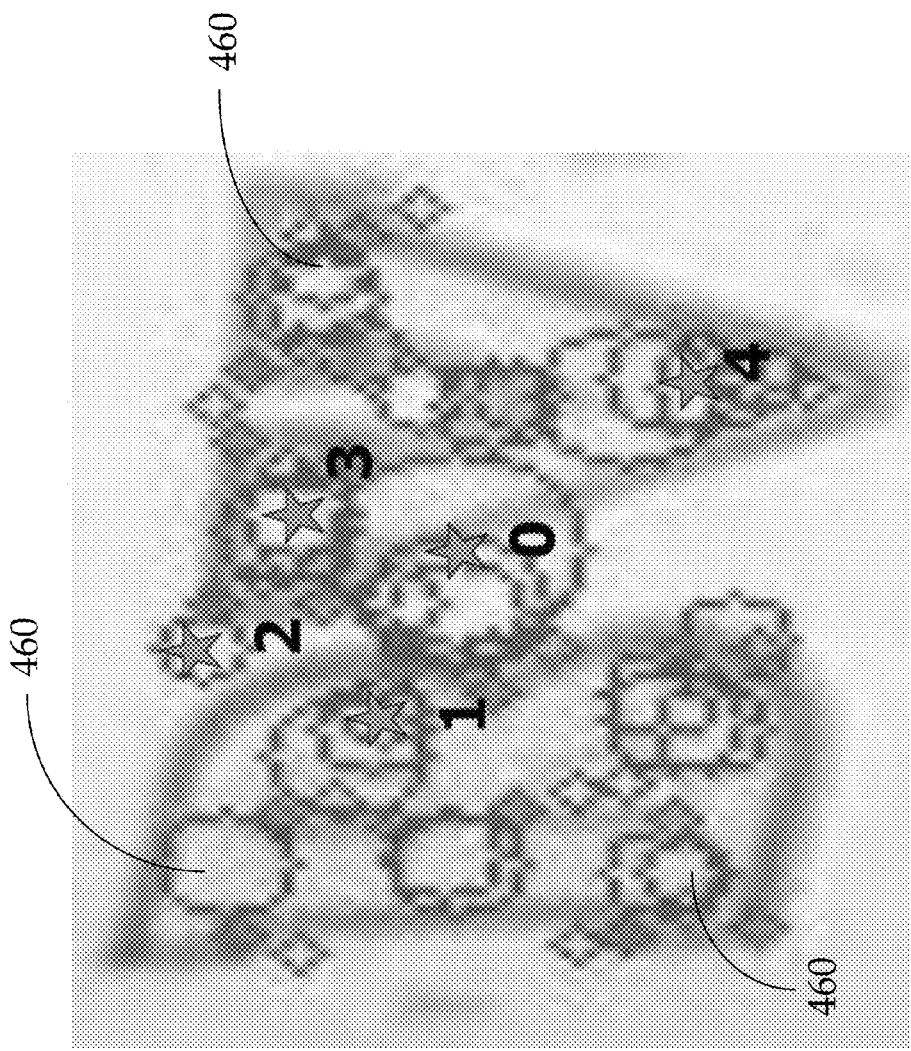
FIG. 4b shows an example of extracting key features and determining feature points on the key features on the input image.

In still a further embodiment illustrated in FIG. 4a, the step of determining an origin and one or more feature points on the key features on the input images 430 may include steps of selecting an origin on the input images 4301; converting an initial coordinate system into a predetermined coordinate system 4302; and selecting one or more feature points representing some key features near the origin 4303. In an exemplary embodiment, the predetermined coordinate system is a polar coordinate system. For example, an image of a BV wine tag is shown in FIG. 4b, where a plurality of blobs 460 are generated to identify key features on the BV wine tag, and a feature point 1 (located at the upper right hand side of the letter "B"), feature point 2 (located at the upper left corner of the letter "V"), feature point 3 (located the upper left corner slightly right of the feature point 2), and feature point 4 (located at lower portion of the letter "V") are selected around the origin "0." In one embodiment, the blobs may be generated by the Hessian matrix as stated above.

Conventional image retrieval algorithms or techniques focus more on comparing and matching the key features of the images, which is disadvantageous especially when the input image is too small, the resolution of the input image is too low, or the input image is not planar. Also, conventional algorithms may need more time to compare and match key features of the images. While focusing on the key features of the images, conventional techniques seem to overlook the importance of the relative locations of the key features. In the present invention, a topological relationship between the feature points is established to more efficiently retrieve images comparing with conventional image retrieval algorithms. Referring again to FIG. 4b for an example, in a polar coordinate system, the distances between each feature points (1, 2, 3, 4) and the origin (0) can be sorted to produce a "Magnitude Sequence," while the angles between each feature points (1, 2, 3, 4) and the origin (0) can also be sorted to produce a "Radius Sequence." As a result, the magnitude sequence of the four feature points is (1, 3, 2, 4), while the radius sequence of the four feature points is (3, 4, 1, 2), as illustrated in FIG. 4b. In other embodiments, the topological relationship can be extended to multiple dimensions, and a sequence such as the magnitude or radius sequence may have to be generated to establish the topological relationship in every dimension.

Figure 4C:
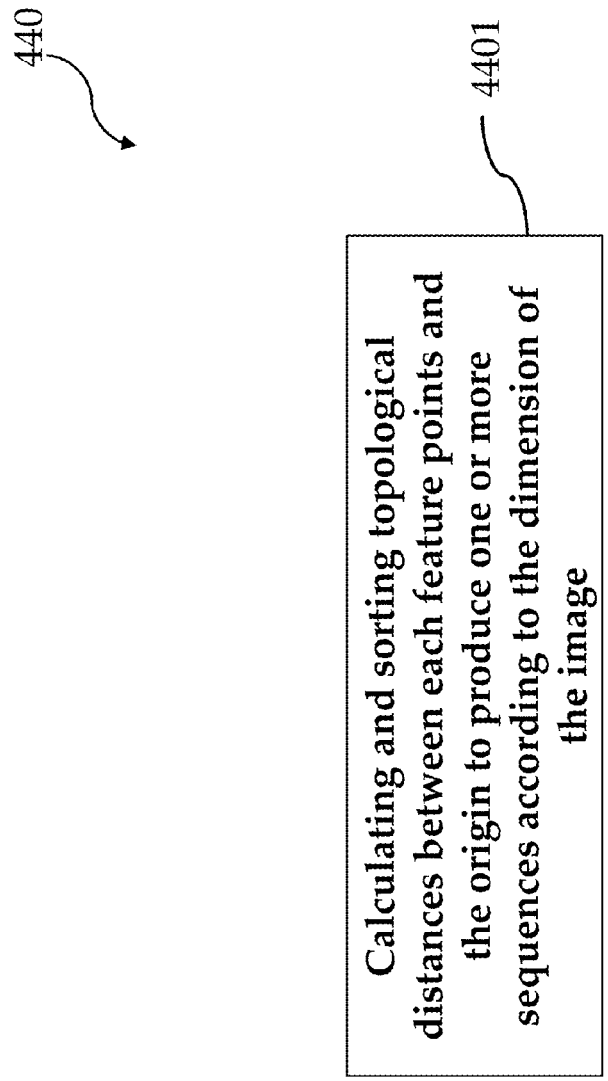
FIG. 4c depicts further steps to establish a topological relationship between the feature points on the key features.

Referring to FIG. 4c, the step of establishing a topological relationship in each dimension between the feature points on the key features 440 may include a step of steps calculating and sorting the distances between each feature points and the origin to produce one or more sequences according to the dimension of the image 4401. In a two-dimensional image, the step of establishing a topological relationship between the feature points on the key features calculating and sorting the distances between each feature points and the origin to produce a magnitude sequence; and calculating and sorting the angles between each feature points and the origin to produce a radius sequence.

Furthermore, a topological order distance (TOD) is introduced and is defined as a "longest common subsequence (LCS) between the given image and a potential matching image in the database. In a two-dimensional image, there are two TODs: Radius TOD (R-TOD) and Magnitude TOD (M-TOD), corresponding to the "Radius Sequence" and "Magnitude Sequence" discussed above, wherein the Radius TOD represents the agreement on relative order of the radius sequence between the given image and potential matching image, while the Magnitude TOD represents the agreement on relative order of the magnitude sequence therebetween. Assuming the origin is at the same position in the input image and a first potential matching image, and each image has five feature points. For example, if the radius sequence of the input image is (1, 3, 4, 2, 5) and the radius sequence of the first potential matching image is (1, 3, 4, 5, 2), the longest common sequences between these two images are three, namely (1, 3, 4). On the other hand, if the radius sequence of a second potential matching image is (1, 3, 2, 5, 4), the longest common sequences between the input image and the second potential matching image are two, namely (1, 3), and the score of the second potential matching image would be lower than the first potential matching image in terms of R-TOD. Similar comparison can be conducted in the magnitude sequence between the images in terms of M-TOD, and a combined score can be generated to determine which images are the closest to the input image. It is noted that the number of TOD is determined according to the dimension of the image.

Figure 4D:
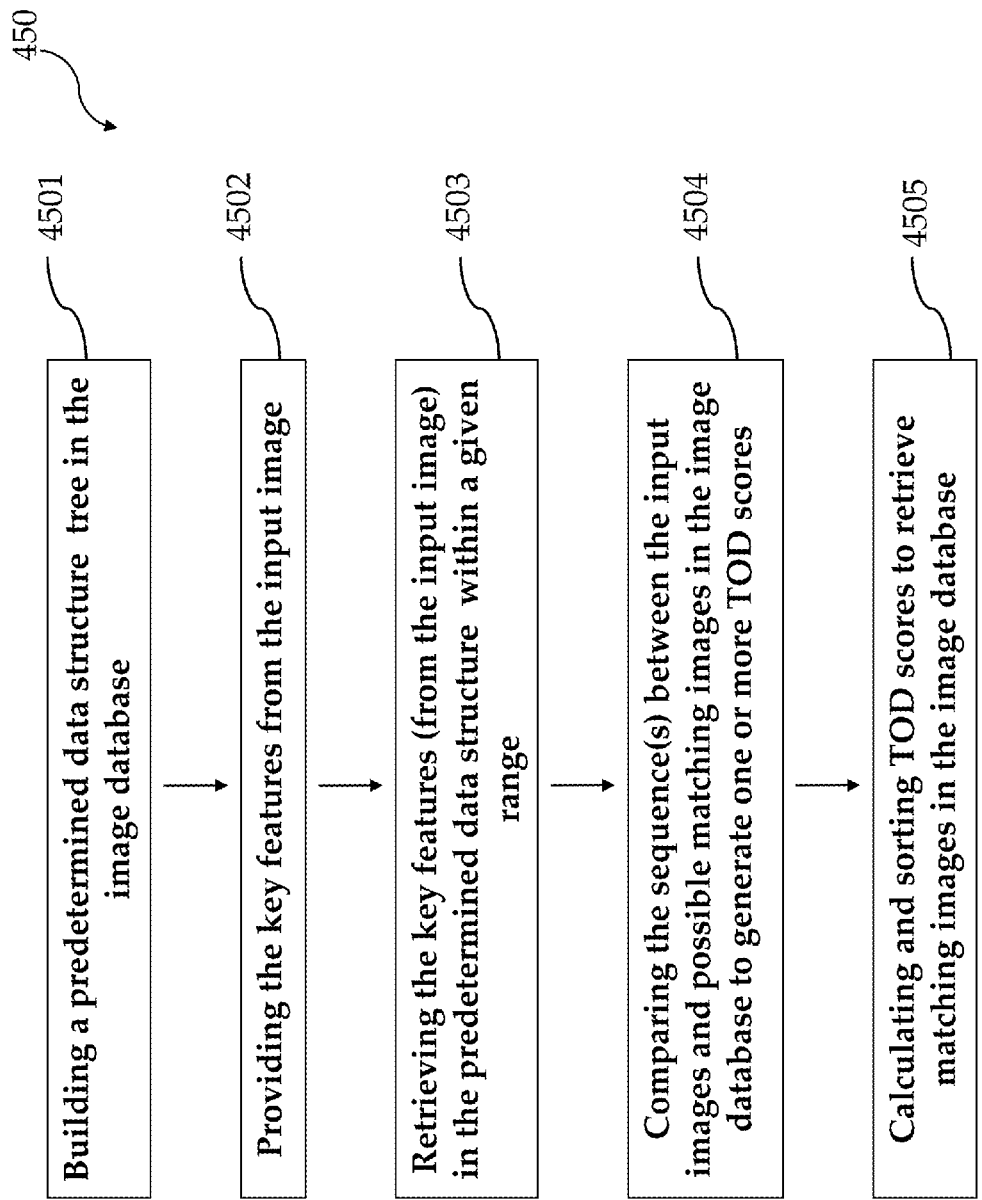
FIG. 4d illustrates further steps to utilize the topological relationship between the feature points to identify the input image in an image database.

In still an exemplary embodiment shown in FIG. 4d, the step of utilizing the topological relationship in each dimension between the feature points to identify the input image in an image database 450 may include steps of building a predetermined data structure in the image database 4501; providing the key features from the input image 4502; retrieving the key features (from the input image) in the predetermined data structure within a given range 4503; comparing the sequence(s) between the input images and possible matching images in the image database to generate one or more TOD scores 4504; and calculating and sorting the TOD scores to retrieve matching images in the image database 4505. In one embodiment, the predetermined data structure can be a k-dimensional tree ("k-d tree"), which is a space-partitioning data structure for organizing points in a k-dimensional space. Namely, the k-d tree is used to hierarchically decompose spaces into a plurality of cells such that it is fast to access any input object by position in each cell.

Figure 4E:
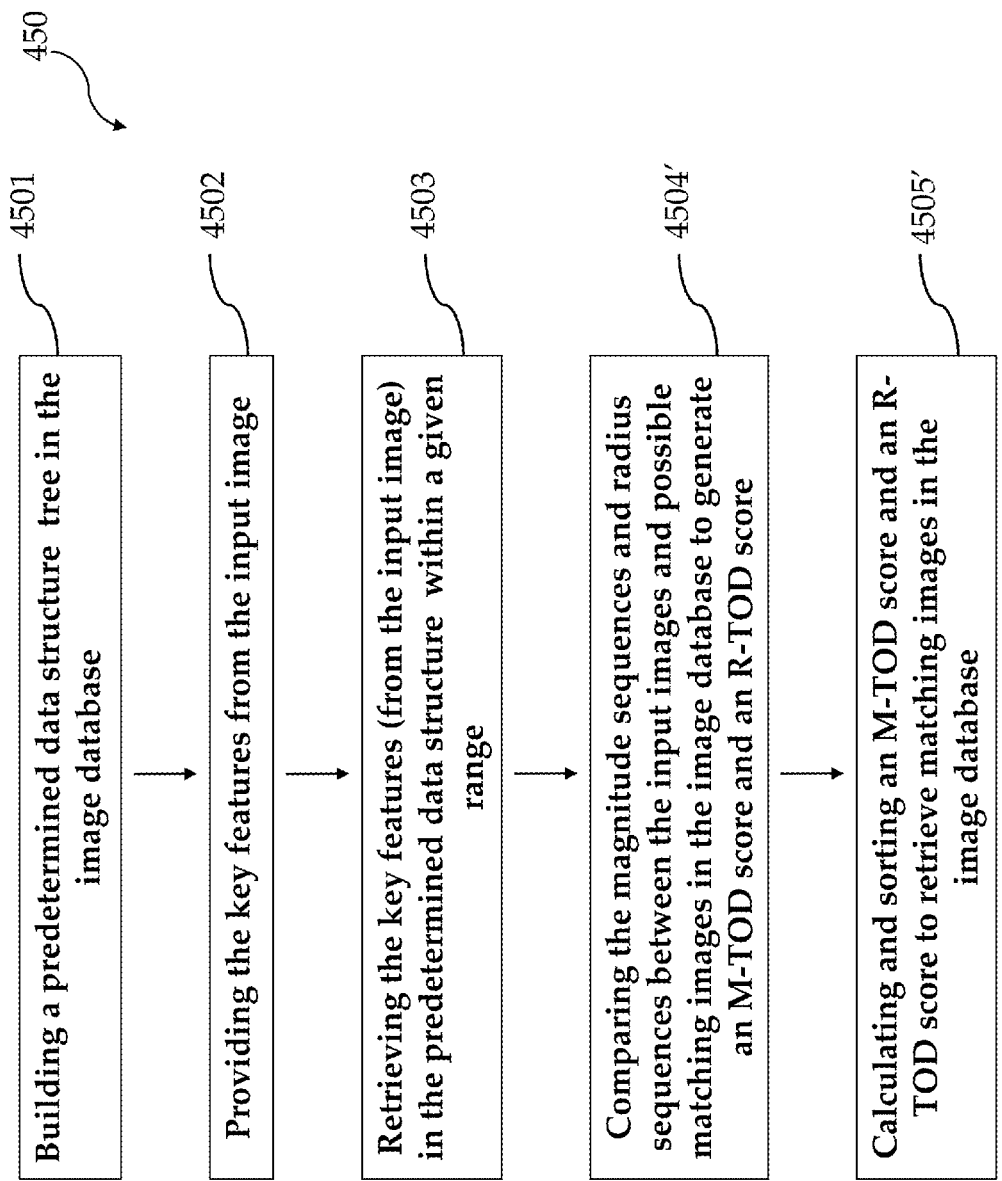
FIG. 4e illustrates further steps to utilize the topological relationship in a two-dimensional image between the feature points to identify the input image in an image database.

In a two-dimensional image, the steps 4504 and 4505 may become comparing the magnitude sequences and radius sequences between the input images and possible matching images in the image database to generate an M-TOD score and an R-TOD score 4504'; and calculating and sorting an M-TOD score and an R-TOD score to retrieve matching images in the image database 4505', as shown in FIG. 4e.

Figure 5:
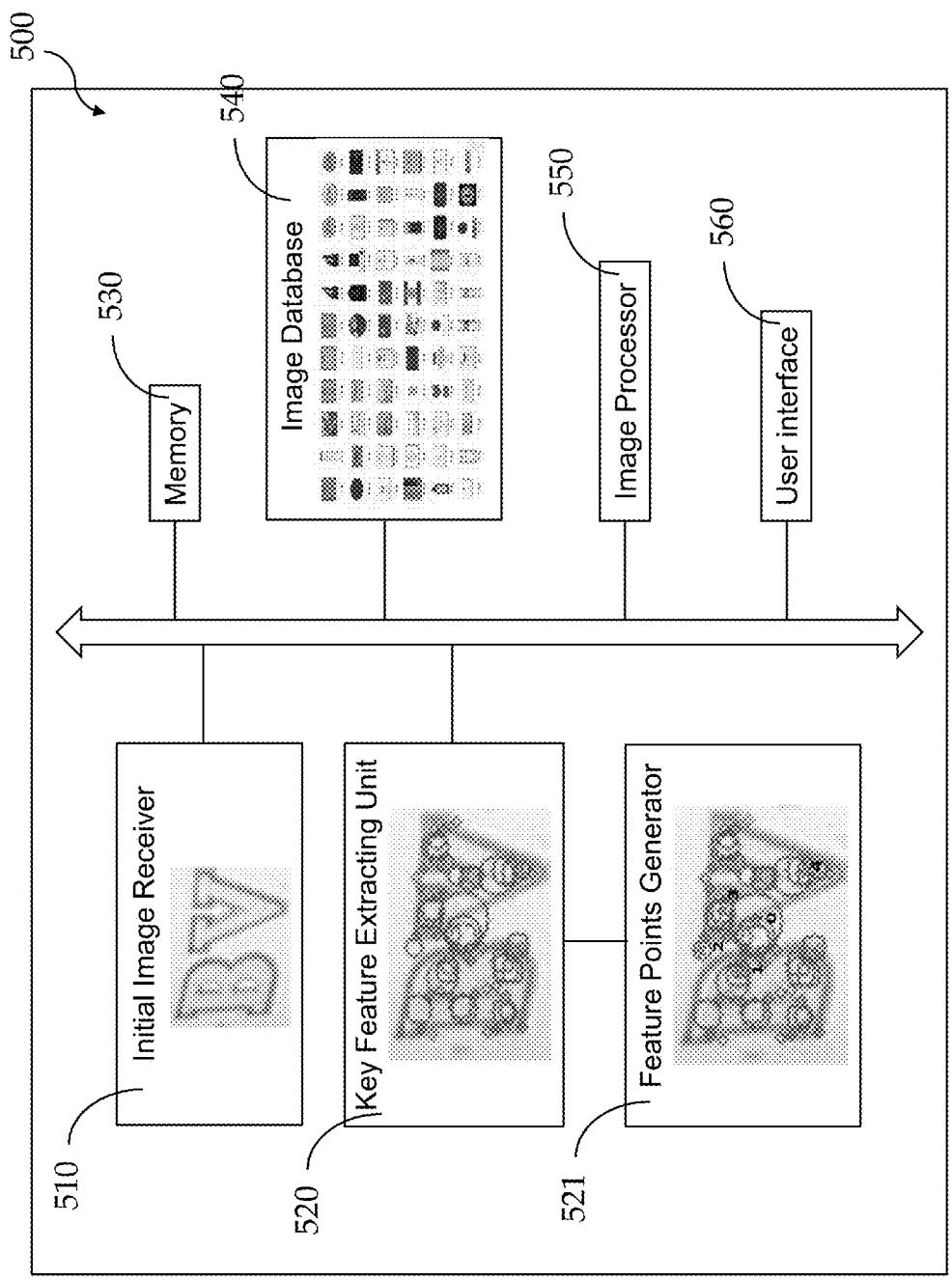
FIG. 5 depicts another aspect of the present invention, illustrating an efficient image retrieval system using TOD algorithm.

In another aspect of the present invention, a system 500 for image retrieval may include an initial image receiver 510; a key feature extracting unit 520; an image database 540 and an image processor 550 executing instructions to perform steps of establishing a topological relationship in each dimension between the feature points on the key features, and utilizing the topological relationship in each dimension between the feature points to identify the input image in the image database. The image retrieval system 500 may also include a memory device 530 and a user interface 560, which may be operatively communicate with the image processor 550 to perform image recognition and retrieval. The result of the image retrieval can be outputted through the user interface 560. In one embodiment, the key feature extracting unit 520 may include a feature point generator 521, as illustrated in FIG. 5.

In one embodiment, the key feature extracting unit 520 may be configured to extract key features by generating a plurality of blobs, especially when certain points and/or regions in an image having different properties such as brightness, color, etc. compared with the environment. In another embodiment, the key feature extracting unit 520 may be configured to conduct edge detection to extract key features, especially when the key features of the image have discontinuities in depth and orientation, or the brightness of key features changes sharply. In a further embodiment, the key feature extracting unit 520 is configured to conduct corner detection to extract key features. In still a further embodiment, the key feature extracting unit 520 is configured to conduct descriptor-detector local feature extractions.

As discussed above, the present invention not only focuses on the key features of the given image, but also the relative locations thereof. After the key features are extracted, the feature point generator 521 is configured to select an origin among the key features, and the origin is better surrounded by the key features that would better represent the given image. Also, the feature point generator 521 is configured to convert an initial coordinate system into a predetermined coordinate system (e.g. a polar coordinate system), and select one or more feature points representing the key features near the origin, as shown in FIG. 4b.

Figure 5A:
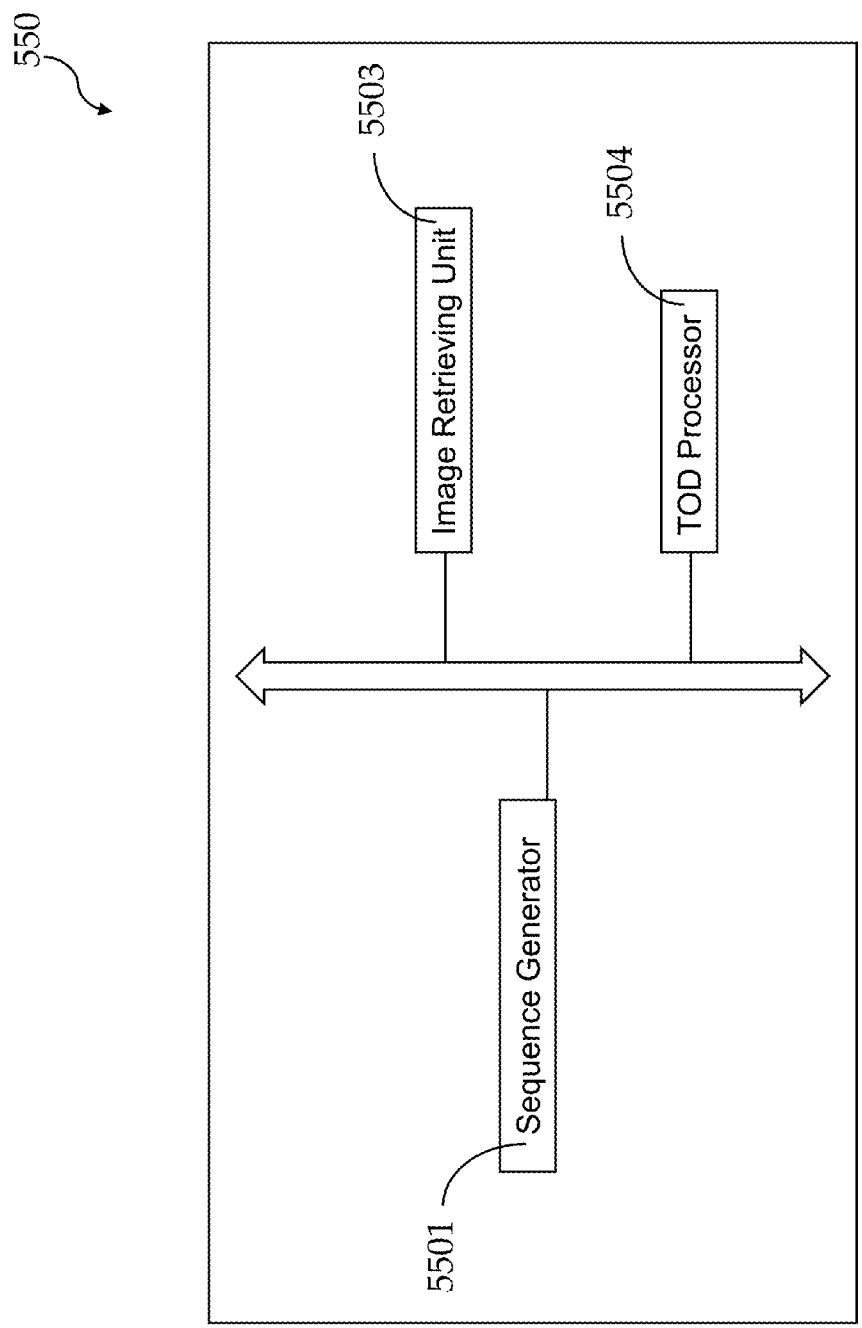
FIG. 5a illustrates one exemplary embodiment in the present invention shown in FIG. 5.
Figure 5B:
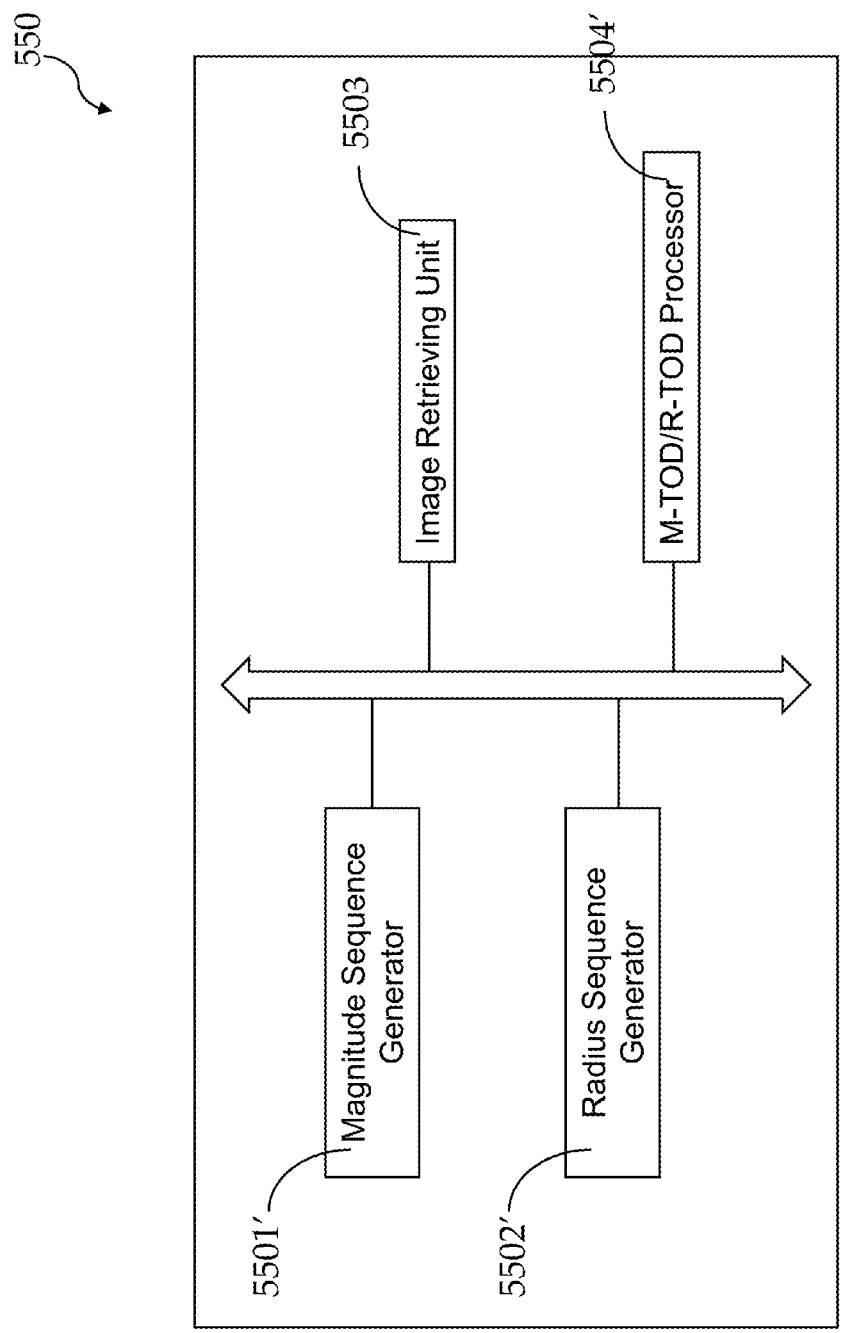
FIG. 5b illustrates one exemplary embodiment of FIG. 5a to handle two-dimensional images in the present invention.

In an exemplary embodiment illustrated in FIG. 5a, the image processor 550 may include a sequence generator 5501, an image retrieving unit 5503 and a TOD processor 5504. It is noted that the sequence generator 5501 is configured to configured to measure topological distances (e.g. length, angle, radius, etc.) between each feature points and the origin, and configured to produce a sequence based on the topological distances therebetween, as well as the TOD processor 5504, which is configured to generate one or more TOD scores according to the number of sequences. In a two-dimensional image, the sequence generator 5501 may include a magnitude sequence generator 5501' and a radius sequence generator 5502', an image retrieving unit 5503 and an M-TOD/R-TOD processor 5504', as shown in FIG. 5b. Referring to FIG. 4b again, the magnitude sequence generator 5501' is configured to measure the distances between each feature points (1, 2, 3, 4) and the origin (0); compare such information; and produce a magnitude sequence, while the radius sequence generator 5502' is configured to measure the angles between each feature points (1, 2, 3, 4) and the origin (0); compare such information; and produce a radius sequence. As a result, the magnitude sequence of the four feature points is (1, 3, 2, 4), while the radius sequence of the four feature points is (3, 4, 1, 2), as illustrated in FIG. 4*b*. It is noted that the magnitude sequence and radius sequence can be considered a "signature" of the image, which can be used as an identifier to compare with other images.

The image retrieving unit 5503 is configured to efficiently retrieve images that may match the input image from the image database 540, wherein the image retrieving unit 5503 may build a data structure (e.g. k-d tree) to divide the images in the image database 540 into a plurality of sub-groups. Provided with the information of key features of the input image, the image retrieving unit 5503 is configured to retrieve possible matching images from the image database 540 according to the key features of the input image; and the magnitude sequence generator 5501' and radius sequence generator 5502' would perform identical magnitude/radius sequence generating process to the possible matching images extracted from the image database 540.

As illustrated above, the topological order distance (TOD) is defined as a "longest common subsequence (LCS) between the given image and a potential matching image in the database, and there are two TODs in a two-dimensional image: Radius TOD (R-TOD) and Magnitude TOD (M-TOD), corresponding to the "Radius Sequence" and "Magnitude Sequence," wherein the R-TOD represents the agreement on relative order of the radius sequence between the given image and possible matching images, while the M-TOD represents the agreement on relative order of the magnitude sequence therebetween, and the longer the common subsequence between the input image and the potential matching image, the higher the score of the possible matching image, namely the possible matching image more similar to the input image. In the image processor 550, the M-TOD/R-TOD processor 5504' is adapted to compare the magnitude/radius sequence between the input image and the possible matching images, calculate scores based on the comparison of the magnitude/radius sequence therebewteen, and determine the matching images in the image database. The matching images can be outputted through the user interface 560.

EXPERIMENTS

Figures 6A, 6B:
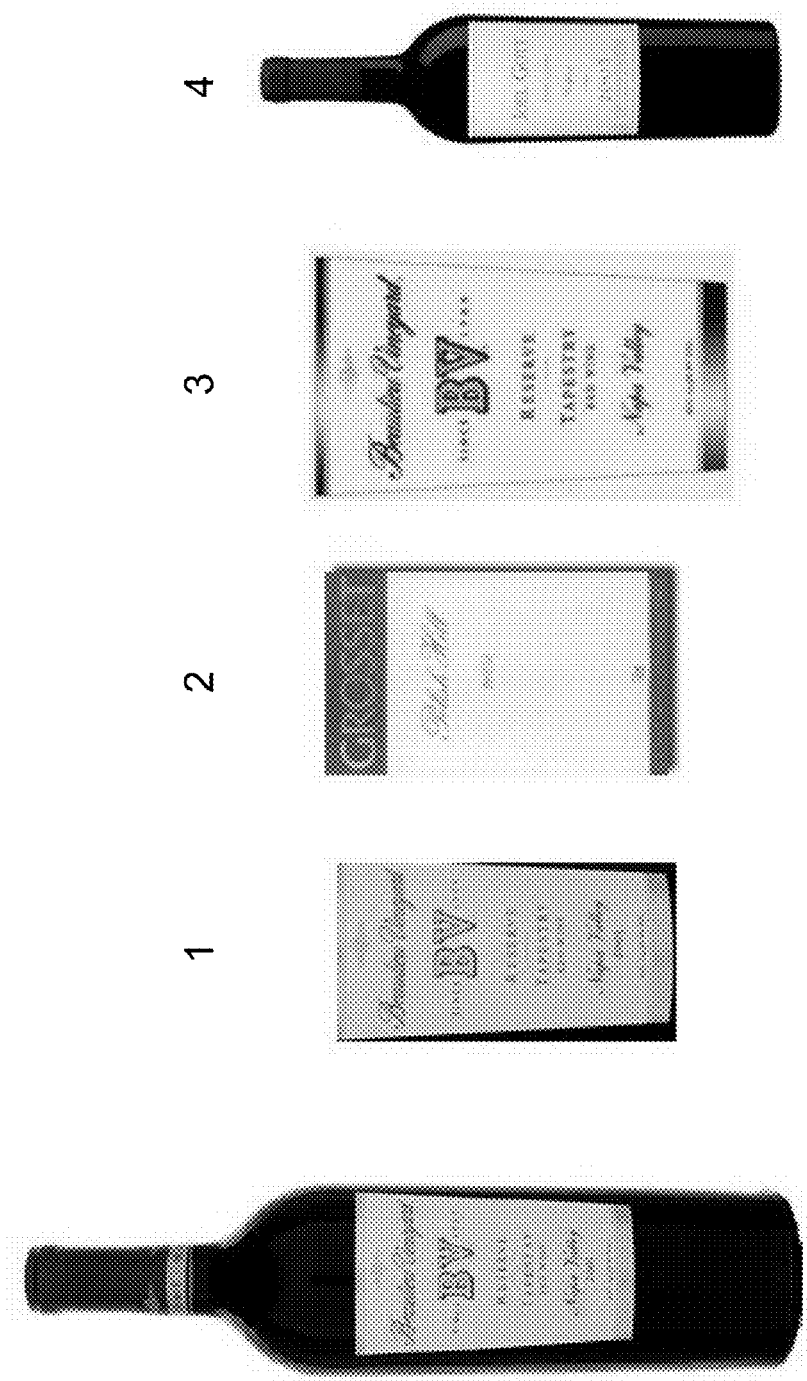
FIGS. 6a and 6b illustrate an experiment testing the TOD algorithm in the present invention, wherein FIG. 6a an input image.
Figures 7A, 7B:
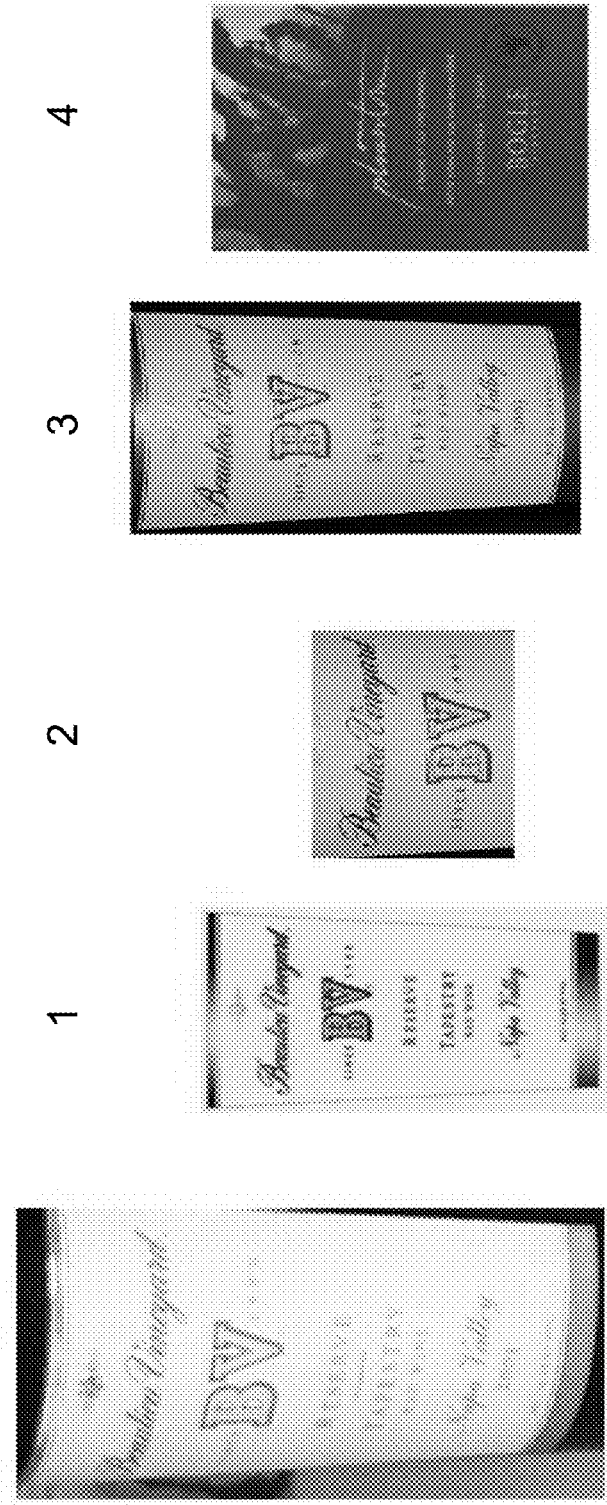
FIGS. 7a and 7b illustrate an experiment testing the TOD algorithm in the present invention, wherein FIG. 7a an input image.

The TOD algorithm illustrated above is tested to retrieve a "By" red wine tag in an image database including images of 9352 wine tags, where the wine tag images are either tiny or with low resolution. FIG. 6*a* shows an input image extracted from the web, and FIG. 6*b* shows the results (top four highest scores from left to right) of using the TOD algorithm to retrieve possible matching images from the image database. According to the results in FIG. 6*b*, two of the top four ranking images match the input image. Similar experiment is conducted and shown in FIGS. 7*a* and 7*b*, where the results show that the first three of the top four ranking images match the input image. It is noted that the input image in FIG. 7*a* is somewhat blurry and not planar, however, the TOD algorithm is demonstrated to be efficient and scale/rotation invariant to successfully retrieve matching images from the image database.

Figures 8A, 8B:
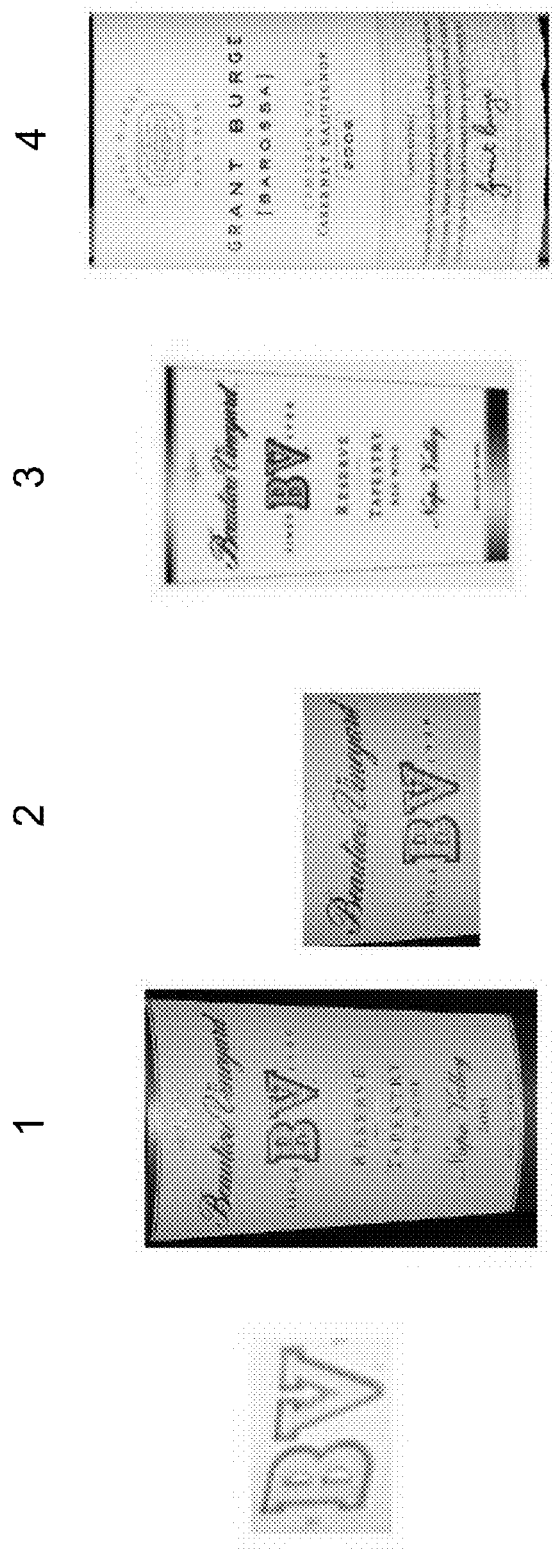
FIGS. 8a and 8b illustrate an experiment testing the TOD algorithm in the present invention, wherein FIG. 8a an input image.
Figures 9A, 9B:
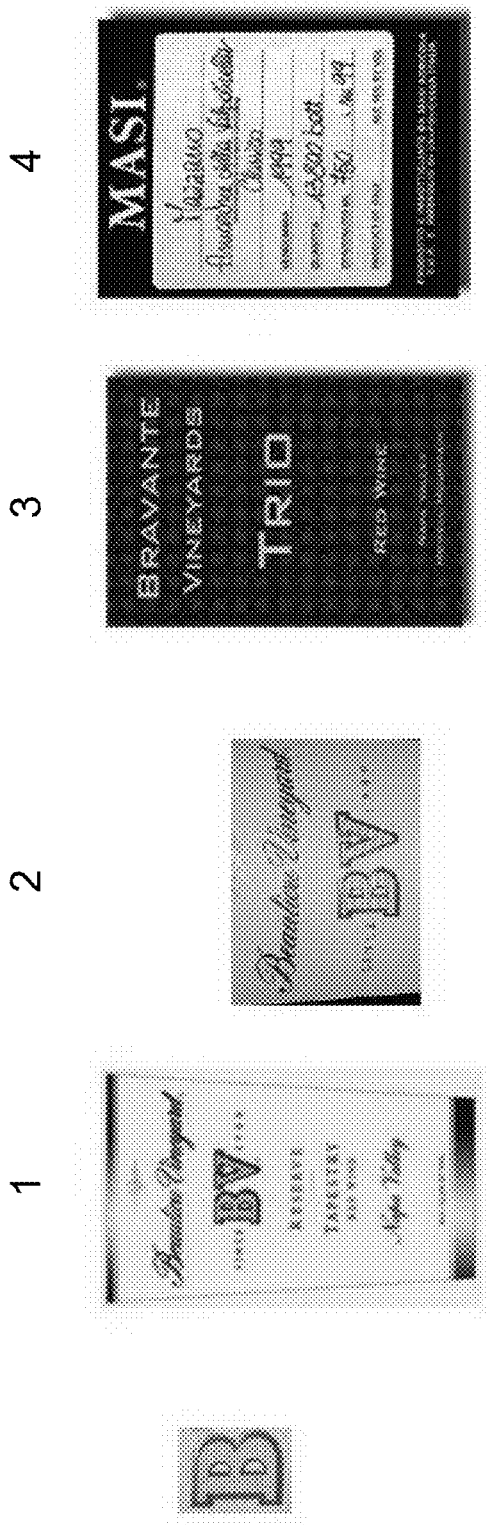
FIGS. 9a and 9b illustrate an experiment testing the TOD algorithm in the present invention, wherein FIG. 9a an input image.

FIGS. 8*a* and 8*b* illustrate another good results using the TOD algorithm. The results from this group is more interesting because the input image of FIG. 8*a* has low resolution with merely 102×74 pixels, however, the results demonstrate that the TOD algorithm is robust regardless of the resolution of the images. More importantly, the process time is only 1.4 ms which is far much faster than either SIFT (855.09 ms) and SURF (78.2 ms) illustrated in FIG. 1. Another experiment using an image with less information (only letter "B") and even lower resolution (44×58 pixels) is shown in FIGS. 9*a* and 9*b*. The results confirm that the TOD algorithm is robust regardless of the size and conditions of the images.

Figures 11A, 11B:
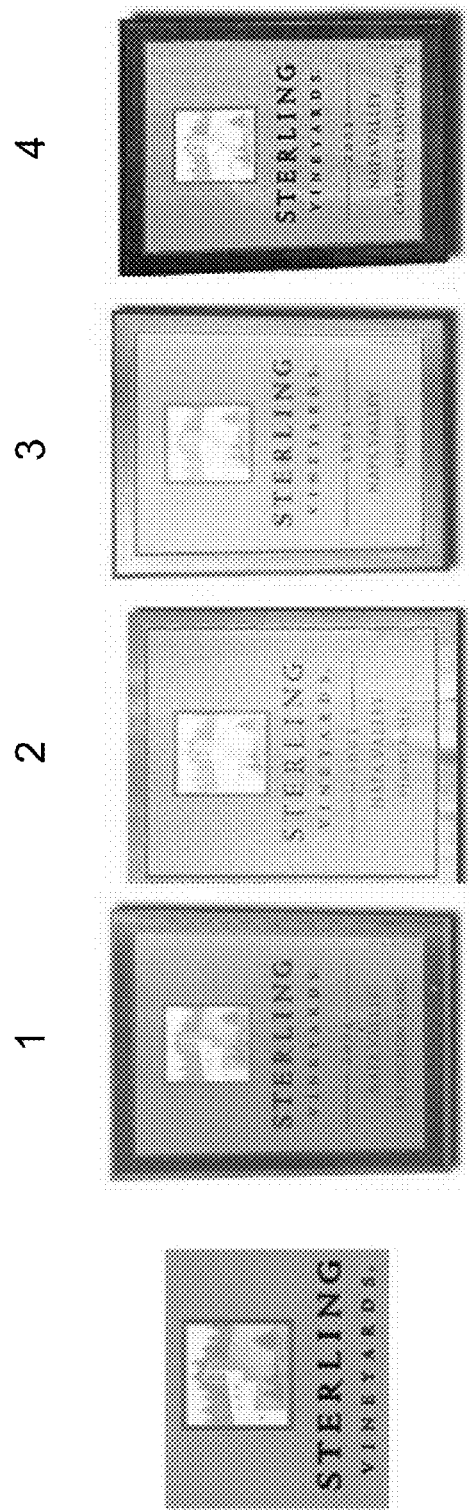
FIGS. 11a and 11b illustrate an experiment testing the TOD algorithm in the present invention, wherein FIG. 11a an input image.

In addition to BV red wine tags, FIGS. 10*a* and 10*b* show another experiment to retrieve a wine tag (or wine tags) in the image database with a wine tag logo shown in FIG. 10*a*. Even though the input image in FIG. 10*a* is with even lower resolution (78×74 pixels), the TOD algorithm can still successfully retrieve matching images from the image database: three of the top four ranking retrieved images match the input image. More encouraging results show in FIGS. 11*a* and 11*b*, where all four top ranking images match an input image (140×120 pixels) shown in FIG. 11*a*.

According to the experiment results, the TOD algorithm repeatedly demonstrates its robustness to retrieve matching images in the image database even though the condition of the image is poor. Comparing with the conventional image retrieval techniques, the TOD algorithm is advantageous because it is more efficient, scale and rotation invariant, and tolerant to affine and perspective transformation.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. An image recognition method, comprising steps of:
   receiving one or more input images with at least two dimensions;
   extracting two or more key features on the input images;
   determining an origin and two or more feature points on the key features on the input images;
   selecting a coordinate system to determine a position of each feature point in the input images, wherein the position of each feature point is determined by at least two parameters according to the dimensions of the input images;
   establishing a topological relationship in each dimension between the feature points on the key features; and
   utilizing the topological relationship in each dimension between the feature points to identify the input images in an image database,
   wherein the step of establishing a topological relationship in each dimension between the feature points on the key features comprises steps of calculating and sorting topological distances between each feature points and the origin to produce one or more sequences according to the dimension of the image, and the sequence at least includes a first sequence related to a first parameter between the origin and each feature points, and a second sequence related to a second parameter between the origin and each feature points in the input image.

2. The image recognition method of claim 1, wherein the step of extracting one or more key features on the input images comprises a step of utilizing a feature detection technique including corner detection, edge detection, blob detection, descriptor-detector local feature extractions.

3. The image recognition method of claim 1, wherein the step of determining an origin and one or more feature points on the key features on the input images comprises steps of selecting an origin on the input images; and selecting one or more feature points representing a portion of key features near the origin.

4. The image recognition method of claim 1, wherein the coordinate system is a polar coordinate system for a two-dimensional image, and the first parameter is angle and the second parameter is distance.

5. The image recognition method of claim 4, wherein the sequence includes an angle sequence and a magnitude sequence in the two-dimensional image.

6. The image recognition method of claim 1, wherein the step of utilizing the topological relationship between the feature points to identify the input image in an image database includes steps of building a predetermined data structure in the image database; providing the key features from the input image; retrieving the key features (from the input image) in the predetermined data structure within a given range; comparing the sequence(s) between the input images and possible matching images in the image database to generate one or more topological order distance (TOD) scores; and calculating and sorting the TOD scores to retrieve matching images in the image database.

7. The image recognition method of claim 5, wherein the step of utilizing the topological relationship between the feature points to identify the input image in an image database includes steps of building a predetermined data structure in the image database; providing the key features from the input image; retrieving the key features (from the input image) in the predetermined data structure within a given range; comparing the magnitude sequences and radius sequences between the input images and possible matching images in the image database to generate a magnitude topological order distance (M-TOD) score and an angle topological order distance (A-TOD) score; and calculating and sorting the M-TOD and A-TOD scores to retrieve matching images in the image database.

8. An image retrieval system comprising:
   means for receiving one or more input images with at least two dimensions;
   a key feature extracting unit including a feature point generator that generates an origin and at least two feature points; and
   an image processor executing instructions to perform:
   selecting a coordinate system to determine a position of each feature point in the input images, wherein the position of each feature point is determined by at least two parameters according to the dimensions of the input images;
   establishing a topological relationship in each dimension between the feature points on the key features; and
   utilizing the topological relationship in each dimension between the feature points to identify the input images in an image database,
   wherein the image processor includes a sequence generator configured to measure topological distances between each feature points and the origin, and configured to produce a sequence based on the topological distances therebetween, and the sequence at least includes a first sequence related to a first parameter between the origin and each feature points, and a second sequence related to a second parameter between the origin and each feature points in the input image.

9. The image retrieval system of claim 8, wherein the key feature extracting unit configured to extract key features by utilizing a feature detection technique including corner detection, edge detection, blob detection, descriptor-detector local feature extractions.

10. The image retrieval system of claim 8, wherein the feature point generator is configured to select an origin, and select one or more feature points representing the key features near the origin.

11. The image retrieval system of claim 8, wherein the coordinate system is a polar system for a two-dimensional image, and the first parameter is angle and the second parameter is distance.

12. The image retrieval system of claim 11, wherein the sequence generator includes a magnitude sequence generator and an angle sequence generator, the magnitude sequence generator configured to measure the distances between each feature points and the origin and produce a magnitude sequence based on the distances therebetween; and the angle sequence generator configured to measure the angles between each feature points and the origin and produce an angle sequence based on the angles therebetween.

13. The image retrieval system of claim 8, wherein the image processor includes an image retrieving unit and a topological order distance (TOD) processor, wherein the image retrieving unit is configured to retrieve images from the image database to match the input images, and the TOD processor is configured to process the sequence(s) between the input image and possible matching images from the image database.

14. The image retrieval system of claim 12, wherein the image processor includes an image retrieving unit and a magnitude topological order distance/angle topological order distance (M-TOD/A-TOD) processor, wherein the image retrieving unit is configured to retrieve images from the image database to match the input image, and the M-TOD/A-TOD processor is configured to process the magnitude sequence and the angle sequence between the input image and possible matching images from the image database.

15. The image retrieval system of claim 13, wherein the image retrieving unit is configured to build a predetermined data structure to divide the images in the image database and retrieve possible matching images from the image database according to the key features of the input image.

16. The image retrieval system of claim 13, wherein the TOD processor is configured to compare the sequence(s) between the input image and the possible matching images, calculate scores based on the comparison of the sequence(s) therebewteen, and determine the matching images in the image database.

17. The image retrieval system of claim 14, wherein the image retrieving unit is configured to build a predetermined data structure to divide the images in the image database and retrieve possible matching images from the image database according to the key features of the input image.

18. The image retrieval system of claim 14, wherein the M-TOD/A-TOD processor is configured to compare the magnitude/radius sequence between the input image and the possible matching images, calculate scores based on the comparison of the magnitude/radius sequences therebewteen, and determine the matching images in the image database.

* * * * *